UNITED STATES PATENT OFFICE.

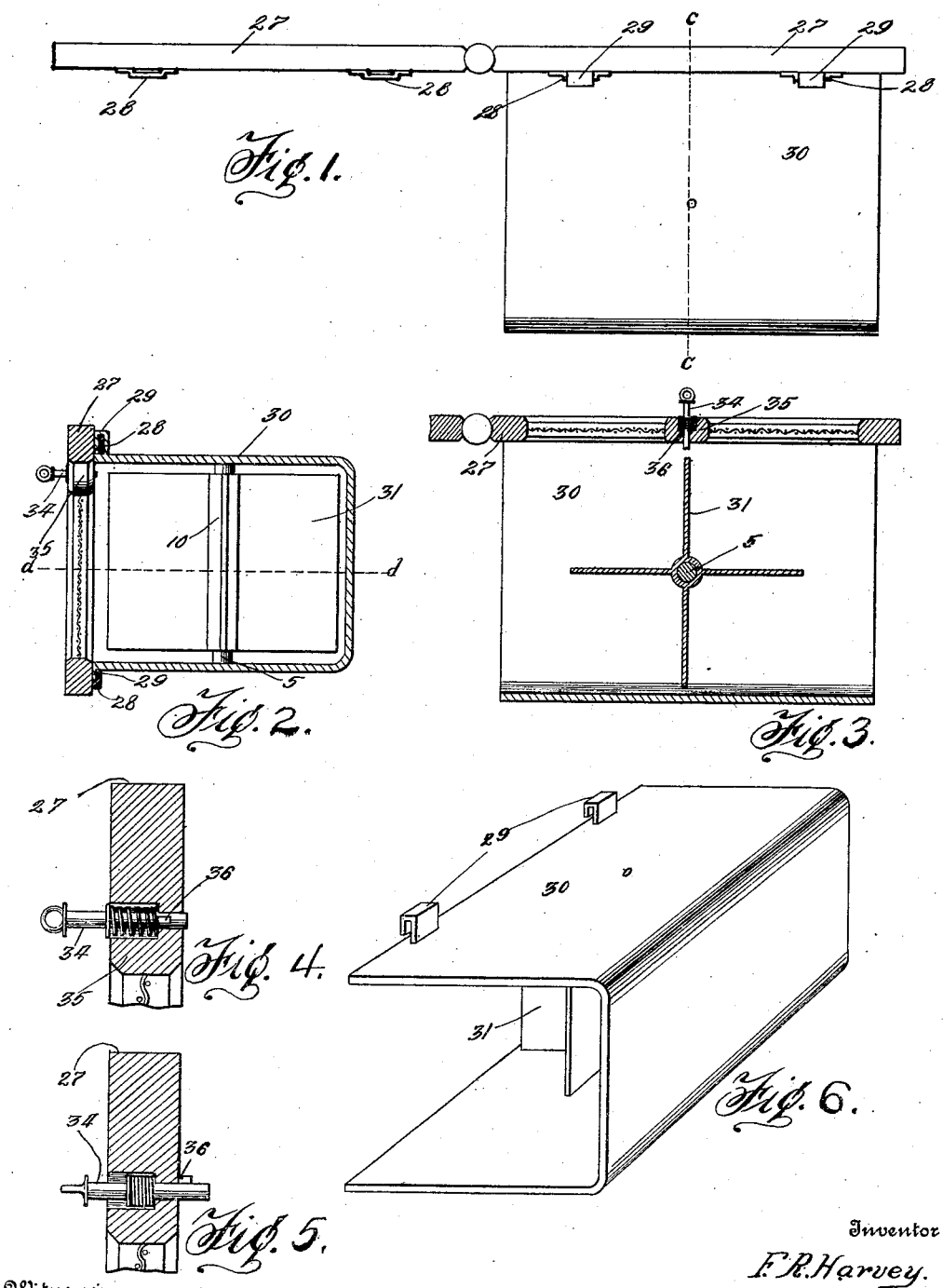

FRANK R. HARVEY, OF PITTSBURG, PENNSYLVANIA, ASSIGNOR OF ONE-EIGHTH TO HENRY A. HERCHENROETHER AND ONE-EIGHTH TO HARRY S. NESS, BOTH OF BELLEVUE, PENNSYLVANIA, AND ONE-FOURTH TO FREDERIC BEEHNER, OF PITTSBURG, PENNSYLVANIA.

VENTILATOR FOR VEHICLES.

938,232.   Specification of Letters Patent.   Patented Oct. 26, 1909.

Application filed November 21, 1908. Serial No. 463,833.

*To all whom it may concern:*

Be it known that I, FRANK R. HARVEY, a citizen of the United States of America, residing at Pittsburg, in the county of Allegheny and State of Pennsylvania, have invented certain new and useful Improvements in Ventilators for Vehicles, of which the following is a specification, reference being had therein to the accompanying drawing.

This invention relates to ventilators for vehicles, and the primary object of my invention is to provide in a manner as hereinafter set forth a novel ventilator for admitting fresh air to the interior of the vehicle and extracting foul air therefrom.

Another object of this invention is to provide a simple and inexpensive ventilator that will be actuated by air set in motion by the forward movement of the vehicle.

A further object of this invention is to provide a ventilator particularly designed for passenger coaches and Pullman cars for removing smoke and foul air from the interior of the coach or car, insuring a thorough ventilation and perfect comfort of the occupants of the car.

A still further object of my invention is to provide a ventilator comprising a horizontal revoluble fan having bearings that will reduce the friction of the fan when in operation to a minimum and thereby insure a positive operation of the fan for the functions prescribed for said fan.

A still further object of this invention is to provide a ventilator that can be advantageously used in connection with window screens, particularly the screens used in the windows of Pullman berths for thoroughly ventilating a berth and insuring perfect comfort to the occupants thereof in the warmest kind of weather.

A still further object of this invention is to provide novel means in connection with a ventilator of the above type for retaining the same in a closed position and preventing rain, snow or foreign matter from entering the interior of the car or vehicle.

A still further object of this invention is the provision of novel means in connection with a ventilator of the above type that will pocket or deflect air toward the ventilator and at the same time exclude snow, rain and other matter that might enter the car or vehicle.

A still further object of the invention is to provide a strong and durable ventilator that can be applied to a car or vehicle without materially changing the construction of the car or vehicle.

With the above and other objects in view which will more readily appear as the invention is better understood, the same consists in the novel construction, combination and arrangement of parts to be hereinafter described and then specifically claimed.

Referring to the drawings:—Figure 1 is a plan of a window screen showing the adaptation therewith of a ventilator in accordance with this invention, Fig. 2 is a sectional view on line c—c of Fig. 1, Fig. 3 is a horizontal sectional view on line d—d of Fig. 2, Figs. 4 and 5 are details of a locking pin used in connection with the ventilator as applied to window screens, and Fig. 6 is a perspective view of a ventilator in accordance with this invention.

Referring to the drawings in detail, the adaptation of the ventilator is shown in connection with a window screen 27 commonly used in the window frames of Pullman cars and is provided with a ventilating fan. The screen frame 27 is provided with keepers 28 and adapted to engage in said keepers are the hangers 29 of an open-ended hood 30. In the hood 30 is journaled a horizontally revoluble bladed fan 31 adapted to force air through the screen frame 27 and ventilate the coach and a berth made up in said coach.

To lock the fan to close the opening 2 and prevent air from being forced into the vehicle, a latch 32 is used adapted to engage in a keeper 33 carried by one of the blades of the fan. The latch can be located upon the frame 1 to hold one of the vertical edges of the fan, or upon the bottom rail of the frame 1 to hold the lower edges of the fan.

The lock used in connection with the fan 31 of the detachable hood 30 comprises a spring-pressed pin 34 mounted in a depending enlargement 35 of the screen frame 27. This pin is adapted to protrude into the hood 30 and prevent the fan 31 from rotating. The pin 34 can be locked in or out of engagement with the fan 31, by a lug 36 carried by said pin for engaging the outer side of the enlargement 35.

My invention in its broadest aspect comprehends means (frame and hood) for detachably holding a ventilating fan relative to an opening in a car, whereby fresh air will be forced into the car and foul air expelled, thus maintaining the interior of the car in a sanitary condition, particularly smoking and sleeping compartments.

While in the drawings forming a part of this application there is illustrated the preferable form of construction, I would have it understood that the elements therein can be varied or changed as to shape, proportion and manner of assemblage without departing from the spirit of the invention.

Having now described my invention what I claim as new, is:—

In a ventilator, a frame having an opening, a revoluble fan supported relatively to said opening for carrying air therethrough as the fan revolves, keepers carried by said frame, and a hood open at both ends and along its inner side, said hood inclosing the fan, and hooks carried by the hood and engaging the keepers carried by the frame for supporting the hood.

In testimony whereof I affix my signature in the presence of two witnesses.

FRANK R. HARVEY.

Witnesses:
MAX H. SROLOVITZ,
K. H. BUTLER.